United States Patent [19]

Lim et al.

[11] Patent Number: 4,518,505

[45] Date of Patent: May 21, 1985

[54] THERMAL SOFTENING PROCESS

[75] Inventors: Git B. Lim; A. Riza Konak, both of Calgary, Canada

[73] Assignee: Exxon Production Research Co., Houston, Tex.

[21] Appl. No.: 492,841

[22] Filed: May 9, 1983

[51] Int. Cl.³ .......................... C02F 1/52; C02F 1/66
[52] U.S. Cl. .................................. 210/712; 166/303; 203/11; 210/737; 210/794
[58] Field of Search .................. 203/11; 210/709, 712, 210/714, 718, 737, 738, 741, 742, 794; 166/267, 303

[56] References Cited

U.S. PATENT DOCUMENTS

| | | | |
|---|---|---|---|
| 938,779 | 11/1909 | Morrison | 210/737 |
| 2,259,717 | 10/1941 | Zentner | 210/715 |
| 2,401,924 | 6/1946 | Goetz | 210/714 |
| 2,775,555 | 12/1956 | Clarkson | 210/709 |
| 2,872,414 | 2/1959 | Gray | 210/737 |
| 2,947,689 | 8/1960 | Cain | 210/737 |
| 3,410,796 | 11/1968 | Hull | 210/737 |
| 3,583,910 | 6/1971 | Stoddard | 210/737 |
| 3,839,199 | 10/1974 | Weiss et al. | 210/712 |
| 3,932,224 | 1/1976 | Hirota et al. | 203/11 |
| 4,029,576 | 6/1977 | Shivers | 210/687 |
| 4,247,371 | 1/1981 | Roller | 203/11 |
| 4,398,603 | 8/1983 | Rodwell | 166/267 |

OTHER PUBLICATIONS

"New Steam Generator Uses Brackish Water", *The Oil and Gas Journal*, Jun. 13, 1966, pp. 54–55.
Hull, "The Thermosludge Water Treating and Steam Generation Process", *J. Petrol. Tech.*, Dec. 1967, pp. 1537–1540.
Lawrence-Allison Associates Corp., "Thermosludge", pp. 1–31.
*Betz Handbook of Industrial Water Conditioning*, 1945, pp. 21–144.

*Primary Examiner*—Peter Hruskoci
*Attorney, Agent, or Firm*—Herbert E. O'Niell

[57] ABSTRACT

A process for heating and softening of hard water by direct heat exchange with steam. The steam is directly sparged into the hard water within a reaction zone and condensed in the water under a pressure sufficient to prevent boiling at the reaction zone temperature. The heated water is then withdrawn from the reaction zone without substantial vaporization of water and filtered to remove scale precipitates resulting from the heating step. At least a portion of the softened water may be heated to generate wet steam which is then recirculated to the reaction zone and sparged into the hard water therein.

18 Claims, 2 Drawing Figures

THERMAL SOFTENING PROCESS

BACKGROUND OF THE INVENTION

1. Field of the Invention

This invention relates to the treatment of hard waters and more particularly to the softening of such waters by the application of heat to remove scale-forming constituents.

2. Description of the Prior Art

In many industrial applications, it is desirable to soften hard water in order to substantially decrease the concentration of divalent metal ions which form insoluble precipitates, commonly referred to as "scale". For example, it is a conventional practice to treat boiler feed waters in order to avoid the deposition of scale detrimental to the operation of the boiler within pipes, boiler tubes, and other locations. Such deposits are commonly characterized as "soft scale"—calcium carbonate and magnesium hydroxide; and "hard scale"—calcium sulfate, calcium and magnesium silicates, and silica.

Various techniques are employed to soften boiler feed waters and other waters used in industrial applications. For example, a commonly used water treatment process involves lime softening, followed by filtration and ion exchange polishing. In this procedure suitable chemicals, e.g. lime and soda ash, may be added to hard water to produce insoluble precipitates such as calcium carbonate and magnesium hydroxide. The water is then passed through a filter to an ion exchange resin where substantially all of the remaining divalent metal ions are exchanged with sodium from the resin.

Other processes involve the application of heat to the hard water in order to enable or accelerate the chemical reactions leading to the precipitation of the scale forming divalent metal ions. Thus, U.S. Pat. No. 3,410,796 to Hull discloses a process in which boiler feed water is heated to precipitate calcium and magnesium ions as calcium carbonate, magnesium hydroxide, magnesium silicate, calcium sulfate and barium sulfate. In the Hull et al process, the raw hard water is fed to a stripper in which it is passed over a series of baffles or trays in direct countercurrent heat exchange with steam flowing upwardly from a "steam drum". Within the stripper, a portion of the steam is condensed into the water. The remainder of the steam is produced from the stripper as a high quality steam. The raw heated water then passes into the steam drum which serves as a reaction zone in which the chemical reactions are carried to completion so that a major portion of the insoluble salts are precipitated. A portion of the water in the steam drum in then continuously removed and directed into the heat exchanger tubes of a steam chest. The water is circulated through the tubes and a portion of it is converted to steam by indirect heat exchange with a heat transfer salt. The steam effluent from the heating tubes then is passed to the steam drum for circulation upwardly through the stripper column.

The use of heat to thermally induce the softening of water by the mechanisms described in the aforementioned patent to Hull, is also disclosed in Hull, "The Thermosludge Water Treating and Steam Generation Process", Journal of Petroleum Technology, December 1967 and Rintoul, "Steam from Waste Water", Pacific Oil World, July–August, 1978. As noted by the Hull and Rintoul articles, a modified stripper operation involves allowing the feed water to travel downwardly through the stripper without contact trays which were found to be subject to the formation of dolomite deposits at the top levels. Suitable softening is accomplished by the chemical reactions taking place in the 350°–600° F. range. As described in detail in the Hull article, where silica is present, sufficient magnesium should be present relative to the silica content to correspond to the formation of at least three moles of magnesium hydroxide for two moles of silica. The Hull and Rintoul articles also further describe the reaction conditions encountered in the softening process. They note that sodium carbonate may be added to the feed water prior to heating by direct contact with the steam to provide sufficient alkalinity for the precipitation of the magnesium as magnesium hydroxide and to provide sufficient carbonate for the precipitation of calcium carbonate. By providing these enabling conditions, the pH may increase from an initial value within the range of 7 to 8 as the feed water enters the stripper to a final value of about 11 to 12 in the boiling zone.

SUMMARY OF THE INVENTION

In accordance with the present invention, there is provided a new and improved process for the heating and softening of hard water by direct heat exchange with steam and which enables such softening to proceed without the deposition of scale on heat-exchange surfaces and without any unacceptable energy losses. In carrying out the invention, hard water containing divalent metal ion scale-forming constituents is passed into a reaction zone. Within this zone, steam is directly sparged into the water under conditions in which the steam is predominantly condensed in admixture with the water to heat it to a temperature at which a substantial portion of the divalent metal ions are precipitated as scale. The pressure on the reaction zone is maintained at a value greater than the vapor pressure of water at the temperature involved. The heated water is withdrawn from the reaction zone without substantial vaporization of steam and then filtered in order to remove scale therefrom and produce soft water. Preferably the temperature within the reaction zone is maintained within the range of 190°–210° C. and the pH of the water withdrawn from the heating zone is at a value within the range of 9–12.

In a further embodiment of the invention, at least a portion of the soft water recovered from the filtering step is heated to generate steam and at least a portion of the steam is recirculated to the reaction zone and directly sparged into the hard feed water.

DETAILED DESCRIPTION OF THE INVENTION

Figure 1:
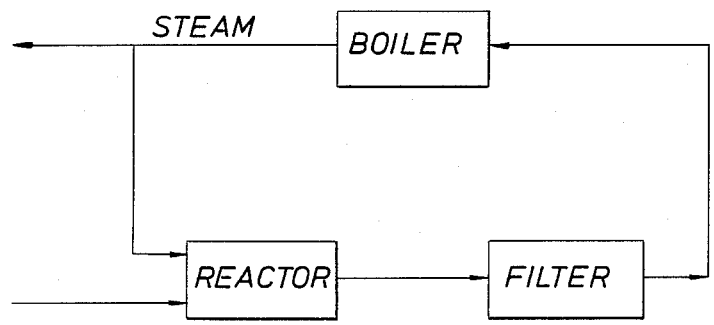
FIG. 1 is a block diagram illustrating the major steps of the present invention.

The chemical reactions and reaction parameters involved in the softening of water by the application of heat are well known to those skilled in the art and are described in some detail in the aforementioned references by Hull and Rintoul. In the present invention these reactions are utilized to advantage in a process which is relatively simple and inexpensive and results in the removal of scale precipitates by filtration in a manner which avoids the deposition of scale deposits on heat exchange surfaces.

The heating of hard water to precipitate scale-forming divalent metal ions takes advantage of the principle that, at elevated temperatures, bicarbonate ions are converted into carbonate and hydroxyl ions with the attendant evolution of carbon dioxide. Under conditions of moderate to strong alkalinity, the divalent calcium or magnesium ions are thus precipitated as calcium carbonate and magnesium hydroxide.

The conversion of bicarbonate ions into carbonate ions at elevated temperatures can be expressed by the following reaction:

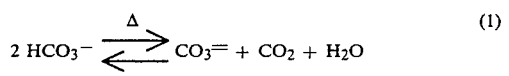
$$2 HCO_3^- \xrightleftharpoons{\Delta} CO_3^= + CO_2 + H_2O \qquad (1)$$

As a result of reaction (1), dissolved calcium in the water reacts with the carbonate ions to form the calcium carbonate precipitate. Where the bicarbonate concentration of the water is in excess of the stoichiometric equivalent of calcium, the excess carbonate ions reacts with water to form hydroxide and carbon dioxide as shown in the following reaction:

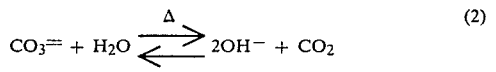
$$CO_3^= + H_2O \xrightleftharpoons{\Delta} 2OH^- + CO_2 \qquad (2)$$

As a consequence of the hydroxyl ions formed by reaction (2), magnesium hydroxide is formed and precipitated out of solution. Silica is also reduced from solution by adsorption on the surface of the magnesium hydroxide particles. This mechanism depends upon the presence of the magnesium hydroxide in sufficient quantity to remove substantially all of the silica from the hard water. Where this is not the case, magnesium oxide or other suitable magnesium compounds may be added to the water to further reduce the silica content through the adsorption mechanism.

In carrying out the invention, the hard feed water is passed into a reaction zone where it is directly contacted with steam issuing from a sparger. The pH of the feed water entering the reaction zone generally ranges from a value of about 6 and up to alkaline pH value, that is, above 7 depending on the impurities present in water. It is sometimes desirable to add a base to the feed stream in order to increase the stream's pH prior to entering the reaction zone. This can be accomplished by adding caustic soda, soda ash, lime, or similar alkalinity-inducing chemicals to the water in an amount to increase the pH of the water to a value within the range of about 9 to 12, typically about 10. Any suitable base can be employed in this step, but usually caustic soda or soda ash will be used. The latter, of course, also offers the advantages of directly increasing the carbonate ion concentration in the feed water. The feed water may have a hardness varying from less than 100 ppm divalent metal ions (primarily calcium and magnesium) up to several thousand ppm. The naturally occurring bicarbonate content of the water is independent of the divalent metal ion concentrations and may vary from perhaps 100 ppm or less up to several thousand ppm. From the foregoing description it will be recognized that while in some cases it will be unnecessary to add a base, there will usually be at least some advantage derived from doing so. Thus, it will normally be preferred in carrying out the invention to add a base to the water in order to increase the pH prior to passing the water into the reaction zone.

In the reaction zone, steam is directly sparged into the water under conditions in which a predominant amount, and under normal operations substantially all, of the steam is condensed in the water. The water is maintained at a pressure above the corresponding vapor pressure for the temperature involved to prevent boiling. The water is thus heated to a temperature at which a substantial portion of the divalent metal ions are precipitated as scale due to the conversion of bicarbonate to carbonate and hydroxide in accordance with reactions (1) and (2) above. The temperature to which the water must be heated is related to the bicarbonate ion concentration of the incoming water relative to the divalent metal ion concentration, and also the pH, as indicated previously. As a practical matter, it normally will be desirable to maintain the temperature in the reaction zone at a value within the range of 150°-250° C. Higher temperatures sometimes can be employed to advantage from the standpoint of the chemical reaction involved. However, any improvement in the process thus gained will usually be more than offset by the increased pressure requirements and heat losses associated with operating at the higher temperatures. As will be described hereinafter, it usually will be preferred to operate at a temperature within a range of 190°-210° C. since this results in a near optimum reduction in hardness of the water.

As the water enters the reaction zone and is mixed with the incoming steam, it undergoes an increase in pH. The final pH of the water will depend upon the initial alkalinity of the water and the amount of heat applied in the reaction zone. Usually the pH of the hot water effluent from the reaction zone should be at a value within the range of about 9 to 12, and preferably within the range of 9.5 to 10.5, although in some circumstances, the pH may be as low as 8.5.

The precipitation reactions take place quite rapidly and reach equilibria within minutes. Residence time in the reaction zone may be as much as 30 minutes, however, residence time in the range of 2 to 10 minutes, typically 5 minutes, is sufficient to carry the reactions to completion. The short residence time required reduces the size requirements for the reaction zone's pressure vessel and also reduces costs.

The water containing the precipitates in suspension is withdrawn from the reaction zone and passed directly to a filtration unit. In the filtration unit, substantially all the precipitates are filtered out. The water is passed to the filtration unit in an effluent line at at least the same pressure as the operating pressure of the reaction zone so that no substantial vaporization of steam occurs prior to the filtering step. Also, appropriate insulation should be provided for the effluent line. These precautions will avoid a significant decrease in temperature of the water with attendant redissolving of the hardness ions.

The steam employed in the heating step may come from any suitable source, but normally will be generated from the soft water produced from the filtering unit. Thus, all or part of the softened water may be applied to a boiler for steam generation.

The quality of the steam employed in the direct heating step is preferably between 30 and 100%. The use of wet steam made from the treated softened water will result in a somewhat higher pH in the reaction zone. The water condensate in such wet steam normally contains significant amounts of hydroxide ions and its pH usually lies within the range of about 11.0 to 12. Use of such wet steam will reduce the amount of caustic or other base to be added to the feed water to arrive at the desired final pH within the reaction zone. The hydroxide ions result from reaction (2) above and also from caustic pretreatment, when that procedure is employed. The significance of employing wet steam in the sparging step is demonstrated by the experimental work described in greater detail hereinafter. Typically, the pH of the water increased by about 3 units in the course of the heating step when wet steam was employed.

Figure 2:
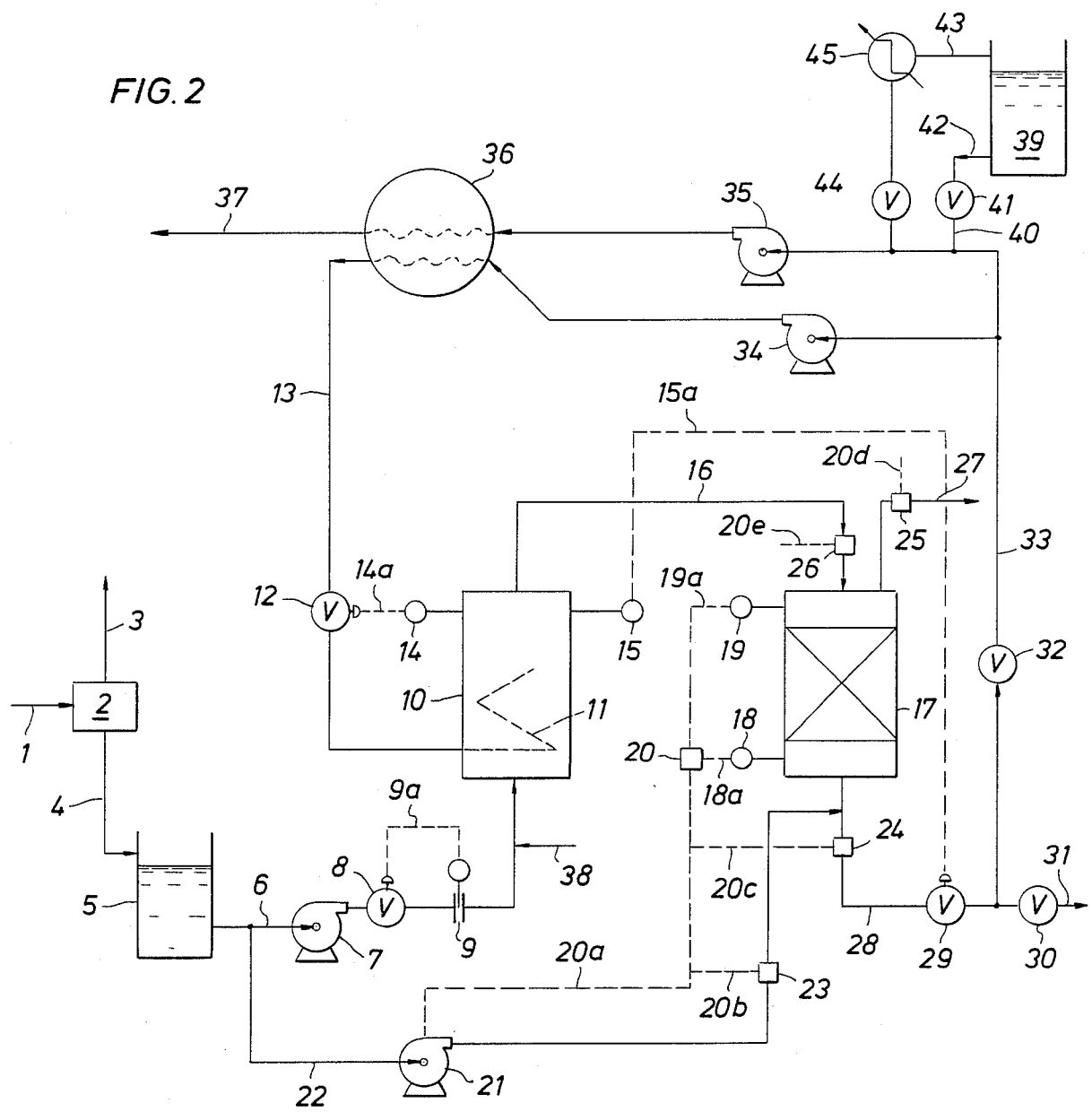
FIG. 2 is a schematic illustration of a system for heating and softening water in accordance with the present invention.

Turning now to FIG. 2 there is shown a schematic illustration of a system which may be employed to soften water in accordance with the present invention. The system is illustrated with reference to the use of the invention in softening produced oil field water and in generating steam and/or hot water for injection into a subterranean formation in conjunction with thermal oil recovery. However, it will be understood that the invention is not limited to such applications and has numerous other uses. As shown in the drawing, the production effluent from one or more wells (not shown) is passed via line 1 to a deoiling stage 2 where the production stream is separated into oil and water phases withdrawn through lines 3 and 4 respectively. The oil-water separation within the deoiling stage may be accomplished by any suitable technique such as the use of oil-field heater treaters, free water knockouts, etc. Typically, the water effluent from the deoiling stage will contain oil in an amount of about 100 parts per million or less. If desirable, the oil content can be further reduced to a value of about 20 parts per million or less by induced gas flotation and filtration. The deoiled water is stored in tank 5 and pumped by pump 7 via line 6 to a suitable reaction zone 10 where it is heated by steam issuing from a sparger 11. Feed water is kept at a constant rate by a control valve 8 with signal from a flow sensor 9 via broken line 9a. In the embodiment shown, feed water is introduced to the reaction zone from the bottom and withdrawn from the top. This flow configuration allows better utilization of the entire vessel internal space for reactions and requires no level control. It also reduces the gaseous $CO_2$ accumulation in the vessel.

The sparger 11 may be a perforated pipe coiled to cover a substantial volume of the reaction vessel. The coiled pipe is perforated so that the steam is sparged downwardly into the water, thus avoiding plugging of the perforations by scale precipitates and ensuring good contact of the water by the steam.

The heating vessel 10 is equipped with temperature and pressure sensors 14 and 15, respectively. The output from temperature sensor 14 controls through broken line 14a the actuator of a valve 12 located in the steam input line 13. Thus, in the embodiment illustrated, the steam flow to the sparger is controlled in response to temperature to maintain the temperature within the reaction vessel 10 at a desired level. It will be recognized of course that other suitable means for steam flow control can be utilized. For example, the steam input into the sparger can be controlled manually, in response to pressure, or in response to the input rate of the feed water, all by means which will be apparent to those skilled in the art.

Within vessel 10 the feedwater is heated to the desired temperature and then withdrawn via line 16 and passed to a filtration unit 17. The filtration unit may be of any suitable type, such as provided by one or more packed columns, screens, etc. A suitable filtration unit may comprise one or more deep bed filters with 10 to 400 mesh size arthracite or dolomite filter medium. Preferably the filter medium mesh size is 20 to 40 mesh to optimize filtering action while reducing flow resistance. As the water effluent is being filtered through one filter vessel, another filter vessel or vessels (not shown) can be backwashed to remove the precipitated scale.

The filtrate from filtration unit 17 is withdrawn via line 28 through a pressure controlled valve 29. In the embodiment shown, a portion of the hot water flows through line 31 through valve 30 to a hot water injection well (not shown) and a portion of the filter effluent flows through line 33 through valve 32 to a boiler 36. Part of the steam produced within boiler 36 is withdrawn via line 37 and applied to one or more injection wells and the remainder is withdrawn via line 13 and employed in the sparging step.

It is preferred in carrying out the present invention to employ low pressure steam in the sparging step. To generate low pressure steam for this purpose, pump 34 delivers soft produced water through specially modified boiler economizer tubes at a discharge pressure between, about 300 and 500 psi. These low pressure tubes should be independent of the other usual economizer tubes, which are normally operated at higher pressures, e.g., on the order of several thousand psi, the high pressure being maintained by the discharge pressure of the feed pump 35.

As described above, the pressure in the reaction vessel 10 is maintained at a value above the steam saturation pressure at the temperature involved. It is also desirable to keep the temperature differential between the reaction zone output and the filtration unit at a minimum. For example, where the temperature of the water withdrawn from the reaction vessel is 200° C., the pressure may be maintained at a value of 300 psig. The decrease in temperature between the heating vessel and the filtration unit usually can be kept to a value of less than 10° C., with the pressure differential between the heating vessel and the filtration unit normally falling within the range of 5–30 psi. Preferably, the filtering step is carried out at a pressure which is greater than the water vapor pressure corresponding to the temperature in the reaction vessel to prevent boiling.

The desired pressure in the heating vessel 10 can be maintained by pressure sensors 15 which applies signals as indicated by broken lines 15a to the controller for valve 29. The controller responds to produce a control function to regulate the effluent from filtration unit 17 by valve 29 to maintain the desired pressure in unit 10. It will be recognized that other suitable means may be employed to regulate the fluid flow from heating zone 10. For example, valve 29 may be operated solely in response to the pressure in the filtration effluent line without regard to pressure within the vessel 10 or it may be operated in response to the pressure at the input to the filtration unit.

The filtration unit is taken out of service for backwash once the differential pressure reaches a certain value, usually 30 psig. For this purpose, pressure sensors 18 and 19 measure the pressure gradient across the filtration unit 17 and send signals through the broken lines 18a and 19a respectively to controller 20. When the pressure differential reaches the preset value, e.g. 30 psig, the controller will trigger a backwash on the filtration unit 17 by switching on the backwash pump 21; by opening the solenoid valves 23 and 25; and by closing the solenoid valves 24 and 26. Broken lines 20a, 20b, 20d, 20c, and 20e, respectively, carry the appropriate signals to accomplish the above functions. Simultaneously, the controller 20 will put other filtration units (not shown) in service by opening and closing appropriate solenoid valves (not shown) on the units. Such systems for alternate filtering and backwashing are well known in the art and no further description need be provided. Water for the backwash, may be taken from a tank 5 via a line 22 and disposed of through a line 27. It is recognized that other backwash schemes can also be applied; e.g., a portion of the soft produced water from other filtration units in service could be used to flush the unit taken offline for backwash. In that case, no backwash pump would be necessary, as the pressure of the soft produced water is believed sufficiently high to backwash the filter medium.

A certain amount of soft water is required to initially produce steam by boiler 36 and to start-up the softening process. Such soft water is stored in tank 39 and withdrawn as needed through line 42, check valve 41, and line 40 for use in the start-up process.

Once the boiler and the softening process are in steady operation, the inventory of tank 39 can be replenished by taking a portion of soft water from the filtration unit 17 to tank 39 through line 43, valve 44 and cooler 45 which cools the soft water to prevent vaporization from taking place once the water pressure is relieved to atmospheric in tank 39.

It is understood that the flue gas leaving the economizer of boiler 36 is substantially hotter than the boiler feed water temperature, i.e. 200° C., and carries with it a certain amount of waste heat. To increase the boiler efficiency, it is desirable to cool the flue gas to 100°–150° C. range by using it to preheat the boiler combustion air with an air heater not shown in FIG. 2. Heating the air before the combustion will reduce boiler fuel consumption and make the process very energy efficient.

The relative amounts of feed water and sparging steam applied to the heating vessel 10 will vary depending upon the feed water temperature and the desired effluent temperature as well as the steam temperature and quality. In experimental work carried out in respect to the invention it was found that the steam flow rate necessary to produce a reaction zone water temperature of 200° C. with a water input temperature of about 80° C. was roughly 38% more than the calculated theoretical steam requirement. As a practical matter, the feed water rate to the reaction zone usually will be about 2.5 times the steam flow rate on a weight basis.

As noted previously, it is sometimes desirable to add a base and magnesium compound to the feed water. These chemicals can be added to the feed water stream via line 38.

Experimental work relative to the present invention was carried out employing deoiled oil field water and also fresh lake water. The deoiled produced water contained calcium ranging from about 100 to 130 ppm and magnesium ranging from about 10 to 30 ppm, both calculated as calcium carbonate. The initial silica level ranged from about 250 to 300 ppm and the pH of the untreated water was about 8. The water contained a few ppm of suspended solids and also contained chloride, carbonate, bicarbonate, and sodium.

An additional test was carried out with fresh lake water which contained 40 to 45 ppm of calcium, 60 to 70 ppm of magnesium and less than 5 ppm of silica. The natural pH of this water was between 7.5 and 8. In this experimental work the feed water was heated to the desired temperature without boiling in a pressure vessel by direct contact with steam. The heated water from the pressure vessel was then passed through a 20–40 mesh size anthracite bed to filter the precipitated scale components.

In the first test described hereinafter, deoiled produced water was heated in the reaction zone with 100% quality steam after the pH of feed water was adjusted to about 9 to 10 by adding caustic sodium hydroxide. In the second test, deoiled produced water was heated with wet steam and no caustic pretreatment was made. In the third experiment, lake water was pretreated with sodium hydroxide before it was heated with 100% quality steam. Although sodium hydroxide was used in the experiments, any suitable caustic may be employed for the pretreatment.

The results of this series of experimental tests are illustrated in Tables I, II, and III.

Table I reports data on samples taken at seven time intervals during the first experiment. The first column indicates the samples were taken of the untreated feed water (UW), the heater feed water (HF), the heater effluent (HE), and the filter effluent (FE). The second and third columns give the calcium and magnesium concentrations of the samples in ppm calculated as calcium carbonate. The fourth and fifth columns give the silica concentration and the pH respectively for each sample. The 6th and 7th columns give the temperature in degrees Centigrade and the pressure in kilopascals (kPa) within the reaction zone at the times corresponding to the sampling intervals. The last two columns in Table I give the input and the output pressures to the filter in kilopascals for the sampling interval. In the experimental work reported in Table I to III, the samples were taken at intervals of roughly 30 minutes to one hour.

The results and operating parameters for the second experiment (also carried out on deoiled produced water) are set forth in Table II. The test results and operating parameters for the third experiment, carried out employing lake water as the heater feed water, are set forth in Table III. The arrangement of Tables II and III is identical to that of Table I.

TABLE I

| Sample | Ca* ppm | Mg* ppm | SiO$_2$ ppm | pH | Reaction Zone T °C. | Reaction Zone P,kPa | Filter P,kPa In | Filter P,kPa Out |
|---|---|---|---|---|---|---|---|---|
| UW | 105 | 30.60 | 303 | 7.2 | 210 | 2200 | 2200 | 2200 |
| HF | 6.6 | 21.40 | 287 | 9.3 | | | | |
| HE | 4.0 | 3.60 | 160 | 9.8 | | | | |
| FE | 0.9 | .12 | 200 | 9.7 | | | | |
| UW | 125.5 | 31.40 | 308 | 7.4 | 206 | 2070 | 2070 | 2070 |
| HF | 6.0 | 21.60 | 290 | 9.2 | | | | |
| HE | 3.7 | 2.60 | 166 | 9.7 | | | | |
| FE | 0.5 | .06 | 193 | 9.7 | | | | |
| UW | 125 | 28.70 | 306 | 7.5 | 209 | 2100 | 2100 | 2100 |
| HF | 5.7 | 19.60 | 288 | 9.6 | | | | |
| HE | 4.4 | 2.60 | 169 | 9.7 | | | | |
| FE | 0.5 | .06 | 193 | 9.6 | | | | |
| UW | 122.5 | 30.50 | 309 | 7.4 | 215 | 2130 | 2130 | 2130 |
| HF | 5.9 | 20.40 | 286 | 9.8 | | | | |
| HE | 4.2 | 2.80 | 163 | 9.8 | | | | |
| FE | 0.4 | .06 | 200 | 9.7 | | | | |
| UW | 122.5 | 31.20 | 310 | 7.4 | 213 | 2000 | 2000 | 2000 |
| HF | 5.9 | 20.70 | 291 | 9.7 | | | | |

TABLE I-continued

| Sample | Ca* ppm | Mg* ppm | SiO2 ppm | pH | Reaction Zone T °C. | Reaction Zone P,kPa | Filter P,kPa In | Filter P,kPa Out |
|---|---|---|---|---|---|---|---|---|
| HE | 3.7 | 2.00 | 162 | 9.8 | | | | |
| FE | 0.4 | .06 | 204 | 9.7 | | | | |
| UW | 120 | 31.10 | 299 | 7.1 | 217 | 2110 | 2110 | 2110 |
| HF | 6.8 | 19.80 | 283 | 9.9 | | | | |
| HE | 6.3 | 2.00 | 157 | 9.9 | | | | |
| FE | 0.4 | .06 | 208 | 9.8 | | | | |
| UW | 127.50 | 31.60 | 305 | 7.4 | 216 | 2000 | 2000 | 2000 |
| HF | 5.9 | 15.60 | 280 | 10.6 | | | | |
| HE | 4.1 | 2.00 | 156 | 10.2 | | | | |
| FE | 0.3 | .06 | 227 | 10.1 | | | | |

*as CaCO3

TABLE II

| Sample | Ca* ppm | Mg* ppm | SiO2 ppm | pH | Reaction Zone T °C. | Reaction Zone p,kPa | Filter P,kPa In | Filter P,kPa Out |
|---|---|---|---|---|---|---|---|---|
| HF | 123.5 | 24.20 | 283 | 7.1 | 207 | 2550 | 2512 | 2512 |
| HE | 3.8 | 7.60 | 131 | 10.0 | | | | |
| FE | 0.3 | .14 | 157 | 10.1 | | | | |
| HF | 125.5 | 24.6 | 286 | 7.1 | 209 | 2540 | 2539 | 2518 |
| HE | 8.1 | 1.8 | 124 | 10.0 | | | | |
| FE | 0.3 | .12 | 165 | 10.0 | | | | |
| HF | 130 | 22.80 | 286 | 7.1 | 210 | 2510 | 2510 | 2484 |
| HE | 3.8 | 7.0 | 126 | 9.8 | | | | |
| FE | 0.3 | .08 | 157 | 9.6 | | | | |
| HF | 120.5 | 22.80 | 284 | 6.9 | 204 | 2570 | 2546 | 2519 |
| HE | 4.5 | 6.2 | 126 | 9.7 | | | | |
| FE | 0.2 | .34 | 152 | 9.8 | | | | |
| HF | 116 | 22.40 | 288 | 6.9 | 215 | 2590 | 2590 | 2567 |
| HE | 5.1 | 7.6 | 127 | 9.7 | | | | |
| FE | 0.3 | .10 | 162 | 9.8 | | | | |

*CaCO3

TABLE III

| Sample | Ca* ppm | Mg* ppm | SiO2 ppm | pH | Reaction Zone T °C. | Reaction Zone p,kPa | Filter P,kPa In | Filter P,kPa Out |
|---|---|---|---|---|---|---|---|---|
| UW | 44.7 | 66.0 | 4 | 7.8 | 198 | 2300 | 2300 | 2300 |
| HF | 13.1 | 18.80 | 3 | 11.1 | | | | |
| HE | 4.5 | 22.40 | 3 | 10.4 | | | | |
| FE | .2 | .32 | 27 | 10.2 | | | | |
| UW | 42.9 | 66.50 | 4 | 7.8 | 201 | 1910 | 1910 | 1910 |
| HF | 6.6 | 6.5 | 3 | 11.3 | | | | |
| HE | 4.1 | 15.2 | 3 | 10.3 | | | | |
| FE | .2 | .33 | 30 | 10.1 | | | | |
| UW | 42.6 | 46.10 | 3 | 7.8 | 204 | 1900 | 1890 | 1863 |
| HF | 6.0 | 4.5 | 3 | 11.5 | | | | |
| HE | 3.5 | 10.4 | 3 | 10.6 | | | | |
| FE | .1 | .19 | 31 | 10.2 | | | | |
| UW | 42.3 | 66.3 | 4 | 8.0 | 205 | 1890 | 1890 | 1876 |
| HF | 5.2 | 3.8 | 4 | 11.7 | | | | |
| HE | 2.3 | 3.8 | 3 | 11.0 | | | | |
| FE | .1 | .13 | 37 | 10.7 | | | | |
| UW | 42.6 | 66.2 | 4 | 7.9 | 201 | 2100 | 2104 | 2104 |
| HF | 18.3 | 44.0 | 3 | 11.0 | | | | |
| HE | 10.9 | 22.0 | 3 | 11.3 | | | | |
| FE | .1 | .1 | 43 | 11.0 | | | | |

*CaCO3

Table I indicates substantial hardness reduction as a result of the caustic pretreatment. Table II shows the substantial reduction in hardness by the steam heating. On an average, for Tables I and II, calcium decreased from 121.9 to 4.6 ppm, magnesium from 27.6 to 4.0 ppm (both expressed as CaCo3), and silica from 297 to 147 ppm in the reaction zone. Considering the approximate water/steam ratio of 2.5 which resulted in approximately 40% dilution of the water by steam condensate, it is estimated that 92% of the hardness ions were removed from the water by precipitation. After the heater effluent was subject to filtration by passing it through the filter vessel, the calcium and magnesium concentrations were further reduced to average values of 0.4 and 0.1 ppm, expressed as CaCO3. By comparing the filter effluent in Tables I and II with the analysis of the heater feed water, it can be seen that 99.5% of the total hardness ions were removed by the heating and filtering steps.

The process softens lake water as well as the oil field produced water as can be seen from Table III. Calcium concentration dropped from 43 ppm in the feed to 0.14 ppm in the filter effluent, and magnesium concentration from 62 to 0.21 ppm, to give a total hardness ion removal of 99.5%.

Calculations similar to those described above for hardness removal indicate, on the average, removal of 30.6% of the silica after the heating step. Other tests, not described in detail here, indicate that the thermal softening process removes in the range of 28% of the silica and that the apparent reduction in silica below that figure is due to dilution by the steam. Depending on the grade of steam used for heating, the apparent reduction in silica ions approached 50%.

It will be noted that the silica levels reported in Tables I, II, and III increased by 30 ppm or more after the heater effluent was passed through the anthracite filter. This observed increase in silica is believed to be due to silica originally present in the anthracite filter which leaches readily into and is dissolved by the filtrate at the high temperatures and pH values involved. It is believed that pretreatment of the anthracite to remove the silica contamination may eliminate the silica leaching. Filter media which do not contain silica may also be used to alleviate this condition.

In the experimental work reported in Tables I through III the reaction zone temperatures were generally maintained in the neighborhood of 200° C. In additional experiments the temperature was varied while the pH was maintained within the range of 9.5-11. The feed water employed in each case was deoiled produced water. The test procedure was similar to the format described above with reference to Tables I through III. In this experimental work, one series of runs was carried out at reaction zone temperatures of 74°±1° C. and a pressure of 2095 kpa. The pH was maintained at about 11.8±4°. The total hardness, expressed as ppm of CaCO3, at the conclusion of the filtration step was in the range of 7.4-8.8 and average total hardness was 8.1. Another series of runs was carried out at a temperatures of 126°±4° C. and a pressure of 2389 kpa. The pH at the conclusion of the heating step was 9.8±0.3. In this test, the total hardness after filtration was in the range of 0.84-2.7 and average total hardness was 1.7 ppm. The third experiment was carried out at temperatures of 201°±5° C., a pressure of 2553 kpa, and at a pH level of 10.1±0.6. In this case total hardness after filtration was in the range of 0.21-0.71 and the the average total hardness was 0.48 ppm. In each case, the values are averages of 5 to 6 sets of samples taken during each experimental run. The results of these tests indicate the sensitivity of the ultimate hardness level to temperature and shows that operating at a temperature of about 200° C. results in a total hardness of less than 1 ppm.

Water having the total hardness levels obtained by the softening process of the invention is generally suitable for use in boiler plant operations. However, water having silica concentrations in the range of or higher than that of the heater effluent in Tables I and II, i.e. 125 mg/kg and up, may be suitable for use in once-through boilers of the type used for oil field steam injection, but for use in utility boilers, such water would require further silica reduction. Such reduction could be accomplished using any of the well-known methods.

Having described specific embodiments of the present invention, it will be understood that certain modifications thereof may be suggested to those skilled in the art and it is intended to cover all such modifications as fall within the scope of the appended claims.

What we claim is:

1. In a process for heating and softening hard water containing divalent metal ion scale-forming constituents and bicarbonate ions, the steps comprising:
   (a) flowing said hard water into a reaction zone;
   (b) directly sparging steam into said water in said reaction zone to predominantly condense said steam in said water and heat said water to a temperature within the range of 150° C. to 250° C. whereby said bicarbonate ions are converted into carbonate and hydroxyl ions which react with the divalent metal ions, whereby a substantial portion of the divalent metal ions are precipitated as calcium carbonate and magnesium hydroxide scale;
   (c) maintaining a pressure on said reaction zone which is sufficient to prevent boiling of the water at said temperature;
   (d) maintaining the pH of said hard water leaving the reaction zone at a value of at least about 8.5;
   (e) withdrawing heated water from said reaction zone;
   (f) filtering scale from said heated water at a pressure sufficient to prevent boiling of the heated water;
   (g) controlling the pressure difference and temperature difference between the reaction zone and the filtering step so that the pressure difference is no greater than 30 psi and the temperature difference is no greater than 10° C.;
   (h) heating a portion of said filtered heated water to produce steam; and
   (i) utilizing said steam in sparging step (b) above.

2. The method of claim 1 wherein step (d), consisting of maintaining the pH of the hard water, comprises producing wet steam having condensate containing significant amounts of hydroxyl ions in step (g) for use in sparging step (b).

3. The method of claim 2 wherein the quality of said steam is within the range of 30% to 100%.

4. The method of claim 1 wherein the residence time of the hard water in said reaction zone is between about 2 and about 30 minutes.

5. The method of claim 1 wherein the residence time of the hard water in said residence zone is about 5 minutes.

6. The method of claim 1 wherein said steam is sparged in a direction counter to the flow of said water into said reaction zone.

7. The method of claim 1 wherein the temperature within said reaction zone is maintained within the range of 190° to 210° C.

8. The method of claim 1 wherein the step of maintaining the pH of said hard water leaving the reaction zone at a value of at least about 8.5 comprises adding a base to said hard water to increase the pH thereof.

9. The method of claim 1 further comprising the step of using at least a portion of the soft water recovered from said filtration step for oil recovery by hot water flooding method.

10. The method of claim 1 wherein anthracite filter medium of mesh sizes between 10 and 400 is used to remove the scale precipitates.

11. The method of claim 10 wherein the filter medium mesh size is in the range of from 20 to 40.

12. The method of claim 1 wherein dolomite filter medium of mesh sizes between 10 and 400 is used to remove the scale precipitates.

13. The method of claim 12 wherein the filter medium mesh size is in the range of from 20 to 40.

14. The method of claim 1 further comprising the step of backwashing the filter medium with untreated water when the pressure gradient across said filter reaches a preselected value.

15. The method of claim 14 further comprising the step of backwashing said filter with soft water produced from said process.

16. A process for softening water containing divalent metal ion scale-forming constituents and bicarbonate ions to decrease the concentration of such divalent metal scale-forming constituents, comprising the steps of:
   (a) flowing the water through a conduit having a reaction zone;
   (b) directly sparging steam into the water in the conduit to heat the water in the reaction zone to a value within the range of about 190° C. to about 210° C. whereby the bicarbonate ions in the water are converted into carbonate and hydroxyl ions which react with said divalent metal ions and precipitate as calcium carbonate and magnesium hydroxide scale;
   (c) pressurizing the water in the reaction zone to prevent boiling of the water;
   (d) controlling the flow of water through the conduit so that the residence time of the water in the reaction zone is at least about two minutes;
   (e) maintaining the pH of the water in the reaction zone at a value within the range of about 9 to about 12;
   (f) filtering the water from the reaction zone at a pressure sufficient to prevent boiling to remove scale from the water to produce softened water from which a substantial portion of the scale-forming constituents has been removed;
   (g) controlling the pressure difference and the temperature difference between said reaction zone and said filtering step so that the pressure difference is no greater than 30 psi and the temperature difference is no greater than 10° C.; and
   (h) heating a portion of said filtered water to produce steam for use in sparging step (b).

17. The method of claim 16 wherein the step of maintaining the pH of the water in the reaction zone includes the step of adding a base to the water in the conduit to increase the pH of the water.

18. The method of claim 16 wherein the step of maintaining the pH of the water in the reaction zone comprises producing wet steam having water condensate containing significant amounts of hydroxyl ions in step (g).

* * * * *